United States Patent [19]
Dunn et al.

[11] 3,987,211
[45] Oct. 19, 1976

[54] METHOD FOR MAKING SLUSH PRODUCTS

[76] Inventors: Lyman D. Dunn, 325 W. 25th Place, Chicago, Ill. 60616; Rafiq Kamil Diab, 6140 S. Sacramento Ave., Chicago, Ill. 60629

[22] Filed: Apr. 2, 1973

[21] Appl. No.: 346,835

Related U.S. Application Data

[63] Continuation-in-part of Ser. No. 819,920, April 28, 1969, abandoned.

[52] U.S. Cl. .............................. 426/551; 426/590; 426/496; 426/524
[51] Int. Cl.$^2$ ..................... A21D 8/02; A21D 10/00
[58] Field of Search ............ 426/95, 152, 190, 226, 426/327, 343, 345, 496, 590, 653, 549, 66, 524, 551, 498; 99/90, 192; 62/66, 136, 340, 343

[56] References Cited
UNITED STATES PATENTS

| | | | |
|---|---|---|---|
| 2,168,934 | 8/1939 | Haskins et al. ..................... | 426/185 |
| 2,863,776 | 12/1950 | Lisher ................................. | 426/190 |
| 2,982,662 | 5/1961 | Cochran et al. .................... | 426/343 |
| 3,069,866 | 12/1962 | Dunn .................................. | 62/136 |
| 3,073,703 | 1/1963 | Dunn et al. ....................... | 426/203 X |
| 3,375,117 | 3/1968 | Schremmer .......................... | 62/345 |
| 3,378,378 | 4/1968 | Goodman et al. ............... | 426/214 X |
| 3,475,181 | 10/1969 | Kracauer ............................ | 426/164 |
| 3,475,182 | 10/1969 | Goodman et al. .............. | 426/302 X |
| 3,477,244 | 11/1969 | Scoggins ............................. | 62/306 |
| 3,505,075 | 4/1970 | Black ................................ | 426/318 |

OTHER PUBLICATIONS
Sommer, *Theory and Practice of Ice Cream Making,* Sixth Edition, Olsen Publishing Company, Milwaukee, pp. 260–266.
41st Edition Handbook of Chemistry and Physics, 1959, Chemical Rubber Publishing Co., Cleveland, p. 2300.
Hackh's Chemical Dictionary, Editor Grant McGraw–Hill Book Company, New York, 1969.

*Primary Examiner*—S. Leon Bashore
*Assistant Examiner*—Steve Alvo
*Attorney, Agent, or Firm*—Coffee and Sweeney

[57] ABSTRACT

Method for making a mixture-type product by preparing a pumpable slush to contain a portion of the product ingredients and then mixing the slush with other product ingredients. Where product temperature control is important, e.g. where the separate mix contains an ingredient which tends to be unstable at elevated temperatures, the slush also serves a cooling and stabilizing function. The slush is prepared by supercooling an aqueous solution of water-soluble product ingredients. For example, water, salt and sugar are used in the manufacture of a food product, dough, and a slush is prepared containing the salt and sugar. Other ingredients of the dough, including a leavening agent which is not stable at the processing temperature and would tend to leaven the dough, are blended as a separate mix. The slush is added to the separate mix and mixed in, resulting in cooling the product below the leavening agent stability temperature while also adding salt, sugar, water and ice (which melts to become water) as ingredients for the dough.

The aqueous slush product can be prepared to have a low dissolved solvents content for dietetic foods such as a dietetic drink. The product is prepared as a mixture of particulate ice, water and a small amount of freeze point depressant material containing no more than a low level of normally solid dissolved material commonly referred to as "solids". The freeze point depressant material can be a soluble inorganic salt, a monosaccharide, etc., and containing a small amount of an organic polar solvent which is liquid at the slush temperature.

4 Claims, 1 Drawing Figure

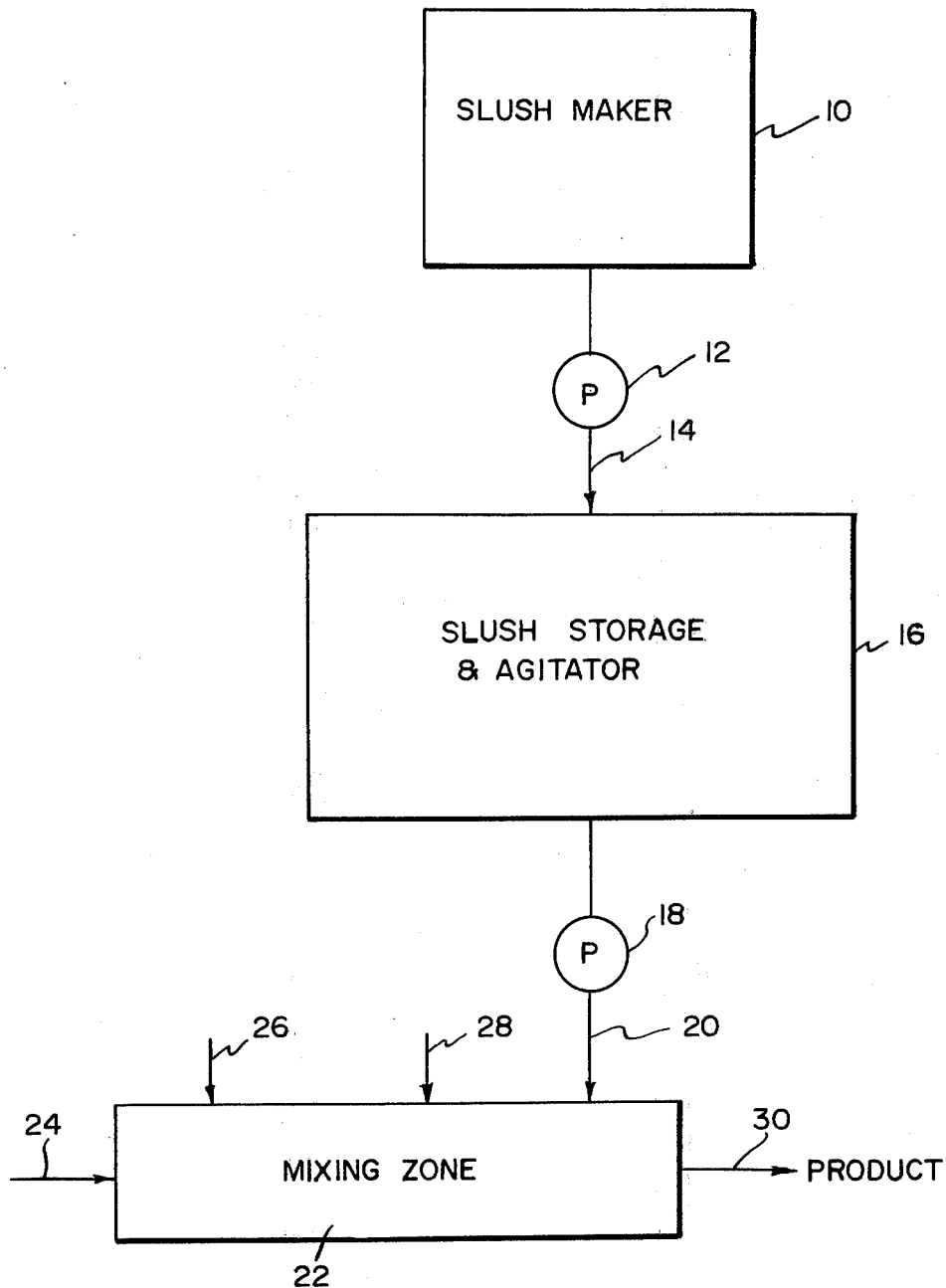

METHOD FOR MAKING SLUSH PRODUCTS

CROSS-REFERENCE TO RELATED APPLICATIONS

This application is a continuation-in-part of our co-pending application Ser. No. 819,920, entitled "Method of Manufacture", filed Apr. 28, 1969, now abandoned.

BACKGROUND OF THE INVENTION

Field of the Invention

This invention relates to the manufacture of products containing water and water-soluble ingredients. This invention further relates to new and useful flowable aqueous slush products having low or no solids content. The invention also relates to a method of producing such products. "Solids content" as used herein refers to dissolved solids and does not include dissolved liquid ingredients.

SUMMARY OF THE INVENTION

The present invention provides a method of making a fluid aqueous food product containing ice particles and water-soluble ingredients. In a first preferred form, an aqueous solution of water-soluble freeze point depressing ingredients is supercooled until agglomerates of ice crystals form, constituting 25 to 75 percent by volume of the total composition and uniformly dispersed therein under gentle agitation. The composition (herein sometimes referred to as "slush") can then be mixed with other ingredients to form still further food products. The method is easily adaptable to continuous processing because the slush has good flowability or pumpability and can be readily flowed or pumped and easily metered.

In a preferred method the slush is mixed with other food product ingredients and cools the other ingredients in addition to combining with the other ingredients to form a final food product. Preferably the slush contains a small amount of hydropholic colloid and in an especially preferred form the aqueous slush contains a small amount of organic polar solvent which is liquid at the temperature of the slush.

The present invention also provides a very simple method of making aqueous slush products of low solids content and good flowability properties. The flowability of the product at low solids level and even in the absence of dissolved solids is very surprising in view of the required high solids content of solutions from which aqueous slush has previously been prepared by the supercooling technique. During supercooling the solvents apparently function to help lubricate ice crystals and/or promote proper ice crystal formation while the solution is being supercooled.

In another preferred form, the slush is prepared by mixing ice particles, such as flaked ice with water containing the appropriate amount of freeze point depressing ingredients.

While this invention is susceptible of embodiment in many different forms, there is shown in the drawings and will be herein described in detail, an embodiment of the invention with the understanding that the present disclosure is to be considered as an exemplification of the principles of the invention and is not intended to limit the invention to the embodiment illustrated.

BRIEF DESCRIPTION OF THE DRAWING

The FIGURE illustrates a flow scheme for making a food product according to one embodiment of this invention.

DESCRIPTION OF THE PREFERRED EMBODIMENT

The fluid aqueous slush used in the present invention is obtained by supercooling an aqueous solution containing ingredients to be used in the product. The preparation of an aqueous slush and the production of ice particles in the aqueous slush is discussed in Dunn U.S. Pat. Nos. 3,069,866 and 3,180,110 and the devices described in those patents can be used in preparing the present slush.

Usually slush making machines will contain a blade which is driven along a path closely spaced from a freezing surface to remove ice crystals as they are formed. For example, in one particular type of slush maker, a plurality of spaced vertical blades are driven on a common axis in a cylindrical path close to contact with a cylindrical wall of a freezing chamber to dislodge ice particles as they form on the wall. In essence, the aqueous slush results because of proper ice crystal growth during freezing of the solution which has a depressed freezing point range. For example, the addition of 5% sugar to water produces a solution which may have a freezing point ranging from about 27° to 32° F. the aqueous slush is prepared by supercooling the solution to a temperature within its freezing point range, which will usually be between about 0° and about 29° F., so that a sufficient portion of the solution forms ice crystals which grow generally uniformly to a pumpable aqueous slush consistency. Usually the aqueous slush will contain between 25 and 75% by volume ice crystals and more often 50 to 70% ice crystals, based on original water content. An aqueous slush containing the appropriate flavoring ingredients can be used as a beverage.

The solution used in preparing the aqueous slush contains a sufficient amount of the water-soluble ingredients to create a depressed freezing point range. The solution will usually contain between 1 and 25% and more often between 5 and 15% by weight water-soluble ingredients. Normally it would require about 12 to 15% by weight sugar (see Dunn U.S. Pat. No. 3,073,703) or about 6 to 7% salt to form a solution which can be supercooled by the usual slush making machine to a flowable slush in the absence of other additives. In preparing aqueous slush products involving freezing or supercooling, a certain minimum level of dissolved solids has been necessary in the solution to assure proper ice crystal formation, and agglomeration good flowability or pumpability of the resulting product and proper functioning of the freezer. These minimum concentrations vary with the type of material dissolved in the aqueous solution, as well as with the type of equipment used during freezing. For example, using one particular slush making device, salt at a level of 6% can provide excellent product flowability while a 5% salt level produces a solution which will not form a good slush and will not properly dispense from that device. In the one particular slush making device where sorbitol is used in the solution, the minimum level may be somewhere between about 6.5 and 7.5%, while for dextrose, it may be between 7 and 8% and for sucrose it may be between 10 and 12%. In another slush maker, an acceptable flowable product might not be obtained even at a salt level about 8%.

In some applications it is desirable to use more dilute solutions for making slush, e.g., in the production of low calorie slush beverages and the like. However, the low dissolved solids contents can prohibit freezing to the desirable slush stage.

In an especially preferred form, the fluid aqueous slush contains a small amount of a water miscible or soluble organic polar solvent which is liquid at the temperature of the slush. Such solvent delays freezing of the ice so that the blade of a slush-making device can better break up crystals as they form. The amount of solvent used may depend on the severity of freezing conditions in the slush-making machine but usually an amount in the range of 0.01 to 5 weight percent is sufficient, although the preferred range is 0.1 to 2 weight percent. Suitable solvents are alcohols, including ether alcohols, such as propylene glycol, n-amyl alcohol, glycerol, diethylene glycol, etc.; ketones such as methylethyl-ketone, acetone, etc.; ethers such as bis-B-ethoxyethyl ether, ethyl isopropyl ether, methoxyethane, etc.; acids and their esters such as acetic acid, methyl acetate, ethyl cyanoacetate, butyric acid, etc. The use of the solvent is especially advantageous in making pumpable slush from aqueous formulations of low solid freeze point depressant content, e.g. between 1 and 10% solid depressant content. The solvent stops buildup of freezing sheets of ice on the slush-maker blades and/or container walls which may otherwise jam the device or at least result in very noisy action or inadequate slush formation. The solvent also tends to soften the ice crystals although not to the point of adversely affecting flowability.

In a preferred form, the aqueous slush contains a hydrophilic colloid in a small amount, e.g., 0.01 to 0.2% or more, and preferably from 0.02 to 0.12%. The hydrophilic colloid permits the use of the lower amounts of water-soluble ingredients in the solution in forming a flowable slush. The colloid acts as a seeding agent and increases the size and hardness of ice crystals formed and its use is especially advantageous where the product being prepared requires the addition of only very small amounts of water-soluble ingredients and a lot of cooling because a dilute solution can be prepared and converted to an aqueous slush.

Useful hydrophilic colloids are more specifically described in Dunn U.S. Pat. No. 3,073,703 and include the various gums such as gum arabic and carrageenin and other compounds such as gelatin, guar, jaguar, gum tragacanth, locust bean gum, pectin, sodium alginate, propylene glycol alginate and carboxymethylcellulose and its water-soluble slats. Expecially preferred are carboxymethylcellulose and its water-soluble salts.

Where the aqueous slush is to be mixed with additional ingredients, such ingredients will contain either water-soluble or water-insoluble ingredients, and more often, both. Water will usually also be present although dry mixtures are contemplated. These ingredients are the ingredients left in the product recipe after subtracting the water and water-soluble amounts of ingredients used in the proportion, over 50%, of the recipe. These remaining ingredients most usually are mixed as a non-slush although it is contemplated that in some preparations, e.g., in preparing a slush food product, they may also be in slush form.

In the preferred form of the method of this invention a food product is produced, in which all ingredients are edible and are used at an edible level. For example, salt, sugar (sucrose), dextrose, sorbitol or the like can be used as the freezing point depressing solids and any of the edible hydrophilic colloids described in Dunn U.S. Pat. No. 3,073,703 or other edible hydrophilic colloids can be used. The water soluble polar solvents should also be edible and particularly preferred is propylene glycol. In a food product the ingredients will be limited in amounts such that they do not impart undesirable tastes to the food product. For example, the colloid and solvent will usually each be used in amounts less than 1.5% by weight, based on finished food product.

Although the preferred use of the present process is in the preparation of a food product, the process can be used for a variety of other mixing and cooling operations such as quenching or cooling heated mixtures. For example, the slush can be used to deliver a catalyst to a low temperature reaction process, such as a low temperature polymerization process, to control temperature in addition to initiating reaction. Reactants which are unstable at ambient or elevated temperatures can also be introduced as a slush and mixed with other reactants. The slush can also be used to add water and water soluble ingredients to a high temperature product and, at the same time, cool the product for purposes of easier handling.

Turning now to the figure in the drawing, the method of the present invention can be carried out by supercooling the aqueous solution of food ingredients in a slush maker 10 such as is described in Dunn U.S. Pat. No. 3,069,866 and Dunn U.S. Pat. No. 3,180,110. The slush is pumpable via pump 12 through line 14 into a slush storage tank 16 which is equipped with an agitator to keep the slush well mixed. Tank 16 is equipped with suitable cooling means to keep the slush at a proper temperature witnin its freezing range. Slush is delivered as needed by a metering pump 18 through a line 20 to a pre-selected mixing stage or zone 22 of a food preparation process. In the mixing zone the slush is mixed with other ingredients to produce a homogeneous food product. Metering pump 18 can be set at a constant rate to meter the correct proportion of slush into the product as the other food product ingredients are moved at a constant rate into the mixing zone 22.

A mixture of 40% salt (NaCl), 25% cane sugar, 25% dextrose and 10% carboxymethylcellulose (CMC) was prepared. One and a half pounds of this mixture was mixed with 7½ pounds of cane sugar and the resulting 9 pounds of material was dissolved in 100 pounds of water. The solution was put into a Stollting freezer such as slush maker 10, and the temperature of the solution was decreased until a slushy product formed containing approximately 65% agglomerated ice crystals and having a temperature of about 27° F. The slush was free of lumps and poured evenly and freely, indicating fairly uniform small ice particle size. A similar material omitting the carboxymethylcellulose could not be flowed from the slush maker.

The slush was to be used with a dough recipe in which the aqueous portion contains approximately 1.15 salt and 2.75% total sugar. All ingredients for the dough were mixed in mormal manner, such as by introduction at various positions along the mixing zone 22, e.g., via inlet lines 24, 26 and 28, except that the total 2.75% sugar was omitted and only 0.95% of the salt content of the aqueous portion was included in the dough mix ingredient. The proper amount of leavening agent, e.g., delta lactone is added at inlet line 28. The ingredients are moved from left to right in zone 22 while mixing, e.g., by a screw mixer or the like. The slush, having been delivered via pump 12 and line 14 into tank 16, maintained at approximately 27° F., is delivered via adjustable metering pump 18 and line 20 into the mixing zone 22 at a predetermined rate.

The slush mixed thoroughly and evenly with the other ingredients to form a dough having a temperature below 40° F., which can be continuously or intermittently withdrawn through line 30 for packaging and storage under refrigeration. The slush also chilled the dough to a temperature maintaining the leavening agent inactive and refrigerated storage retains this inactivity.

The following additional examples are offered as further illustration of the principles of the invention. All examples and preparations reported were run by freezing in a Sani-Serv 708 SL slush maker, unless otherwise indicated.

EXAMPLES 1–4

In order to demonstrate the effect of the hydrophillic colloid, mixtures of the ingredients in amounts (parts by weight) indicated in Table I were prepared:

TABLE I

| Example: | 1 | 2 | 3 | 4 |
|---|---|---|---|---|
| Salt | 40 | 40 | 40 | 40 |
| Sugar (Sucrose) | 25 | 30 | 32.5 | 30 |
| Dextrose | 25 | 25 | 25 | 30 |
| CMC 7 HP* | 10 | 5 | 2.5 | 0 |
| Total | 100 | 100 | 100 | 100 |

*Carboxymethylcellulose

1½ lbs. of each of the above mixes were added, along with an additional 7½ lbs. of sugar, to 100 lbs. of water providing a solution having about 8.25% total dissolved solids content. The solutions were then frozen to a slushy consistency at about 27° F. in a horizontal type slush freezer. Examples 1 and 2 produced slushes having excellent flowability, while the flowability of Example 3 was poor. The slush formed from Example 4 resembled an icy mush and was not flowable.

Other experiments were run on various compositions and it was found that a 10% solution of sucrose alone, with no colloid, produced a solution which did not freeze in the slush maker, while a 12% solution produced a slush having very good flowability. Using colloid, salt solutions having above 4% or more dissolved solids have been converted to acceptable flowable slushes.

EXAMPLES 5–7

These examples are for the purpose of illustrating the effect of total solids in a colloid-containing slush composition. In each example, 1½ lbs. of the composition of Table I, Example 2, were added to 100 lbs. of water. In Example 5, 7½ lbs. additional sugar were added; in Examples 6 and 7, 6 and 4½ lbs. additional sugar were added respectively. The solutions were supercooled to 27° F. and each one produced a slush of good flowability, although Examples 6 and 7 produced pounding noises in the freezer during freezing. This indicates that the gum produces desirable flowability even below the solids level at which the freezer will operate smoothly.

EXAMPLES 8–12

9 lbs. of salt were added to 100 lbs. of water and the solution was supercooled to 16° F. in a Sani-Serv 601 Slush and Shake Maker, and formed a mush that would not flow or dispense from the freezer. The following Examples were then prepared containing the ingredients in parts by weight indicated in the table:

TABLE II

| Example: | 8 | 9 | 10 | 11 | 12 |
|---|---|---|---|---|---|
| Salt | 90 | 96 | 98 | 99 | 99.5 |
| CMC 7 HP | 10 | 4 | 2 | 1 | .5 |
| Approx. % Colloid (CMC 7HP) in Solution | .137 | .05 | .025 | .0125 | .00625 |

9 lbs. of each of the above mixtures were added to 100 lbs of water giving the approximate percent colloid in solution shown in Table II. Each of the resulting solutions was supercooled to 16° F. in the Sani Serve 601 freezer. Examples 8 and 9 produced slushes having excellent flowability and Example 10 produced a slush of good flowability, while Example 11 formed a slush of poor flowability and the Example 12 slush was not flowable from the freezer. The lower freezing temperature was needed for the salt solutions compared with sugar because, as is well known, salt depresses the freezing point of a solution a greater amount than a corresponding amount of sugar.

A variety of hydrophilic colloids or gums have been used and found to be effective in forming flowable slushes from solutions of low dissolved solids content. The amount of colloid used will vary somewhat with the purity of the colloid, its thickening quality, its molecular structure and other factors. Carboxymethylcellulose, the preferred colloid, is a synthetic gum or colloid of high purity and the effect resulting from the amount used can be closely controlled. It is also economical. In working with carboxymethylcellulose, it has been found desirable to use at least 0.025%. There seems to be no upper limit on the amount of colloid or gum which can be used up to the point where the colloid may affect the finished product in an adverse manner, e.g. by imparting undesired taste in the case of a food product.

As another example of the preparation of a food product, a slush is prepared containing salt and the resulting slush is added to other ingredients of a frankfurter recipe to provide the salt and moisture while chilling the frankfurter ingredients.

An advantage of using the slurry for adding ingredients and chilling a food product, especially in preparation of a dough product, is that the chilling, in addition to retarding chemical reactions which may be triggered by higher temperatures, reduces bacteria and mold activity.

EXAMPLES 13–16

Aqueous solutions were prepared for Examples 13–15 containing 12, 13 and 14% by weight sucrose. A fourth solution was prepared for Example 16 containing 12% by weight sucrose plus 0.05% by weight CMC 7 HP and .25% propylene glycol. The solutions were converted to slushes at about 27° F. in a Sani Serv 708 SC slush maker. The slushes had excellent flowability properties after a normal freeze cycle, although very slight noise was produced from the freezer during freezing of all solutions except the 14% sugar solution (Example 15).

EXAMPLES 17–22

Using a 50—50 sucrose and dextrose mixture as the sugar, aqueous solutions containing the amounts of ingredients listed below were prepared:

| Example | Sugar, Wt. % | CMC, Wt. % | Propylene Glycol, Wt. % |
|---|---|---|---|
| 17 | 11 | 0 | 0 |
| 18 | 10 | 0 | 0 |
| 19 | 9 | 0 | 0 |
| 20 | 9 | 0 | .25 |
| 21 | 8 | .05 | .25 |
| 22 | 8 | 0 | .50 |

When subjected to the freezing conditions of Examples 13 to 16 all froze to excellent slushes although in the case of Example 19 the freezer was noisy during freezing.

PREPARATIONS 1 AND 2

For comparison purposes two solution (Preparations 1 and 2) were prepared each containing 8% of the sugar. Preparation 1 also contained .25% propylene glycol and Preparation 2 contained 0.05% CMC. Under the conditions of Examples 13–16, neither froze to a slush and the freezer was noisy in both cases.

EXAMPLES 23–29 AND PREPARATIONS 3 AND 4

Using dextrose alone as the dissolved sugar ingredient, the following aqueous solutions were prepared:

| Example | Sugar, Wt. % | CMC, Wt. % | Propylene Glycol, Wt. % |
|---|---|---|---|
| 23 | 5.5 | .05 | .50 |
| 24 | 6.5 | .05 | 0 |
| 25 | 7 | 0 | .25 |
| 26 | 8 | 0 | 0 |
| 27 | 6 | 0 | .25 |
| 28 | 6 | .05 | .25 |
| 29 | 6 | .05 | .50 |
| Prep. 3 | 6 | .05 | 0 |
| Prep. 4 | 7 | 0 | 0 |

When subjected to the freeze cycle of Examples 13 to 16 all of the above Examples 23–29 formed excellent flowable slushes, although 27 was only partially frozen (about 50% ice crystals and 50% liquid). Preparation 3 froze but the slush was not flowable. Preparation 4 would not freeze and the freezer was extremely noisy.

EXAMPLE 30

Example 23 was repeated and, when subjected to the freeze conditions of Examples 13 to 16 was only partially frozen (about 50% ice crystals and about 50% liquid) but the freeze was normal with no noise from the freezer and the flowability of the product was excellent.

A series of experiments was also run using salt alone as the freeze point depressing solid and it was found that amounts as low as 3.50% salt produced at least a partially frozen product (about 16° F.) of excellent flowability with only very slight noise from the freezer where the solution also contained 0.05% CMC and 0.25% propylene glycol.

Still another series of experiments was run using sorbitol in lieu of the salt or sugar and it was found that a good product was obtained at 7% sorbitol solution level with or without CMC, although at a 6% level with 0.05% CMC the product did not freeze in the Sani Serv 708 Slush Maker. At levels of 5 and 6% sorbitol plus .05% CMC and 0.25 to 0.5% propylene glycol slushes were formed having excellent flowability.

Solvents other than propylene glycol were also tested using 6.5% dextrose and 0.5% solvent. When n-amyl alcohol was used as a solvent flowability was good but it was noticed that the crystal size in the product was somewhat different than that produced with propylene glycol. Ethyl alcohol (190 proof), n-butyl alcohol and glycerol produced products having 20, 30 and 40% ice crystal content but which were still flowable. When acetone was used as the solvent flowability was good and the porosity of the product appeared to be greater than with propylene glycol.

EXAMPLES 31 and 32

These Examples were prepared by dissolving 8% by weight of 50—50 sucrose and dextrose mixture in water; 0.05% by weight carboxymethylcellulose (CMC 7 HP) as a gum, and a 0.25% propylene glycol were added to Example 31 and 0.50% propylene glycol was added to Example 32. The two solutions were converted to slush in a Sani Serv 708 SC slush maker by supercooling to 27° F.

Examples 31 and 32 both produced excellent flowable slush products although Example 31 caused very slight noise in the slush maker during freezing.

EXAMPLES 33–44 AND PREPARATIONS 5–11

Aqueous solutions of the following ingredients in the amounts indicated were prepared.

| Example | Solids, Wt. % | CMC, Wt. % | Propylene Glycol, Wt. % |
|---|---|---|---|
| 33 | 5.5 (Dextrose) | .05 | .25 |
| 34 | 5.5 (Dextrose) | .05 | .50 |
| 35 | 7.0 (Dextrose) | — | .25 |
| 36 | 6.0 (Dextrose) | — | .25 |
| 37 | 6.0 (Dextrose) | .05 | .25 |
| 38 | 6.0 (Dextrose) | .05 | .50 |
| 39 | 5.5 (Dextrose) | .05 | .50 |
| 40 | 5.0 (Salt, Nacl) | .05 | .25 |
| 41 | 4.0 (Salt, Nacl) | .05 | .25 |
| 42 | 3.5 (Salt, Nacl) | .05 | .25 |
| 43 | 6.0 (Sorbitol) | .05 | .25 |
| 44 | 5.0 (Sorbitol) | .05 | .50 |

| Preparation No. | Solids, WT. % | CMC Wt. % | Propylene Glycol, Wt. % |
|---|---|---|---|
| 5 | 8.0 (1) | .05 | — |
| 6 | 5.5 (Dextrose) | — | — |
| 7 | 6.0 (Dextrose) | .05 | — |
| 8 | 7.0 (Dextrose) | .05 | — |
| 9 | 5.0 (Salt) | — | — |
| 10 | 6.0 (Sorbitol) | .05 | — |
| 11 | 3.0 (Salt) | .05 | .25 |

(1) A 50/50 mixture of sucrose and dextrose.

The solutions of Examples 33–39, 43 and 44 and Preparations 5–8 and 10 were frozen to slush consistency in a Sani Serv 708 SC slush maker by freezing to 27° F. with agitation by the slush maker blades. The solutions of Examples 40–42 and Preparations 9 and 11 were similarly frozen at a temperature of about 16° F. All of the examples provided slushes having excellent flowability or pumpability with the exception of Examples 33 and 41 where the flowability was poor and good, respectively. Freezer noise was noticeable in Examples 33 and 44 while in the other Examples, noise was very slight, if any. Examples 36 and 39 contained about 50% ice crystals and the remaining examples contained about 65% ice crystals. Preparations 5 and 8–11 would not freeze and Preparations 6 and 7 produced nonflowable products.

EXAMPLES 45 TO 49

These Examples are for the purpose of illustrating other useful solvents. In each of Examples 45 to 49 a 6.5% dextrose solution was used and 0.5% of the solvent identified below for each example was added.

| Example No. | Solvent |
|---|---|
| 45 | n-amyl alcohol |
| 46 | n-butyl alcohol |
| 47 | glycerol |
| 48 | ethyl alcohol (190 proof) |
| 49 | acetone |

Each of Examples 45–49 was converted to a slush under the same conditions set forth in examples 31 and 32. Example 45 produced a slush similar to that produced by the propylene glycol except that the size of the ice crystals was different from that formed with propylene oxide. The butyl alcohol in Example 46 produced a product containing 30% ice crystals while the glycerol and ethyl alcohol of Examples 47 and 48 produced slushes having 40 and 20% ice crystals, respectively. The slush of Example 49, using acetone, produced a slush similar to that produced by propylene glycol except that it was slightly coarse while the preferred propylene glycol produced a homogeneous slush.

Although any soluble solids can be used for producing slushes for such purposes as quenching chemical reactions and/or introducing reactants into chemical reactions as discussed in copending application Ser. No. 819,920, the preferred slush products are food products in which all ingredients are edible and are used at an edible level. For example, salt, sugar (sucrose), dextrose, sorbitol or the like can be used as the freezing point depressing solids and any of the edible hydrophilic colloids described in U.S. Pat. No. 3,073,703 or other edible hydrophilic colloids can be used. The water soluble polar solvents should also be edible and particularly preferred is propylene glycol. In a food product the ingredients will be limited in amounts such that they do not impart undesirable tastes to the food product. For example, the colloid and solvent will usually each be used in amounts less than 1.5% by weight, based on finished food product.

Sugars will often be used as freeze depressants as dissolved solids in slush products, whether food products or non-food products. We have found that the monosaccorides permit proper slush formation at a lower dissolved solids level than do the polysaccorides such as sucrose and other disacchorides. Therefore, for low solids slushes, the monosaccorides are preferred over the polysaccorides.

Another type of slush or liquid product containing dispersed individual ice particles can be used. That slush is similar to the slush produced by supercooling except that the ice particles, of the size in the range of 1/32 to 1/16 inch, are preformed and nonagglomerating. They are individual praticles having a uniform solid ice composition or construction throughout. The slush is not prepared by supercooling but rather it is prepared by mixing ice particles, such as flaked ice, with water and an amount of water soluble ingredient sufficient to function as a freeze point depressant in the mixture.

The following examples are offered as further illustration of the invention and are not intended as limiting the invention to the specific examples given. In all examples below, unless otherwise indicated, the aqueous slush used contained two parts of ice by volume per part of water by volume, essentially equivalent to a 1:1 weight ratio of ice:water. The slush compositions were prepared by adding the water and ice, plus other ingredients as indicated in the examples, to a Stiffler mixer maintained at a temperature of about 28° or 29° to 30° F. and having a driven propeller-like mixing blade in the bottom of the mixing chamber. The ice was cube ice crushed in the mixer by the blade, unless otherwise indicated. The mixer is described in U.S. Pat. No. 3,030,083. The mixer automatically provided a 6-second mixing cycle every 10 minutes.

EXAMPLE 50

2.5% Dextrose was added to the water-ice mixture and pourability or flowability of the resulting slush was very poor. An additional 0.5% dextrose (total now 3.0%) was added and flowability became better than fair. Addition of another 0.5% by weight dextrose (total now 3.5%) produced a slush which had excellent pourability and could be poured from a cup leaving no residual ice in the cup. When left in the Stiffler mixer overnight, the composition did not freeze but remained a flowable slush.

EXAMPLE 51

Example 50 was repeated using sorbitol in lieu of dextrose and the results were the same except that at the 3.0% sorbitol level the flowability was not quite as good as where dextrose was used.

EXAMPLE 52

Another batch of the ice and water mixture was prepared in the mixer and 0.5% propylene glycol was added. Pourability was very poor. 0.25 Weight percent additional propylene glycol was added and the flowability was still poor. After addition of another 0.25 weight percent propylene glycol (total 1%) pourability became fair and when the concentration of propylene glycol was increased to 1.25 weight percent, the flowability was improved to the extent where the slush would pour from a cup but left some ice product in the bottom of the cup. The level was increased to 1.5% by weight propylene glycol and the product poured very nicely although slight foaming was observed. Addition of another 0.25% propylene glycol, bringing the total to 1.75%, produced a product which had excellent flowability and poured completely from the cup. The slush was left in the Stiffler mixer over the weekend and retained its flowability.

EXAMPLE 53

0.5% salt (NaCl) was added to a fresh mixture of the ice and water in the mixer and the resulting slush had fair flowability. Addition of 0.25% more salt improved the pourability to a point where it was good and another addition of 0.25% by weight salt produced excellent pourability. Again there was no freezing and the product remained flowable when kept in the Stiffler mixer over the weekend. Comparing the product of Examples 52 and 53, it was noted that the ice crystals in the slush of Example 52 were slightly larger than those in Example 53.

EXAMPLE 54

1% of acetone was added to a water-ice mixture in the mixer, producing a slush having very poor flowability. The acetone concentration was increased to 1.25%, then to 1.50% and then to 1.75% and pourability became poor, good and excellent respectively. Formation of froth or foam was noticed and it was noted that the crystals were larger and coarser than the crystals produced in Example 52.

EXAMPLE 55

2% by weight sorbitol and 0.1% by weight propylene glycol were added to an ice-water mixture in the mixer and pourability was poor. The propylene glycol concentration was increased to 0.3% and then 0.4% and the pourability was good and very good, respectively.

EXAMPLE 56

To another ice-water mixture in the mixer, 0.35% propylene glycol and 0.35% sodium chloride were added and the slush had fair pourability. The concentration of each ingredient was increased to 0.45% and pourability became good. At a 0.5 level of each ingredient the pourability was very good.

PREPARATION 12

Medium and high viscosity hydrophilic colloids, i.e., carboxymethylcellulose (CMC) gums, were tested for their influence on pourability. At a 0.05 level in the ice-water mixture, the pourability was very poor for each. The level for each was increased to 0.65% by weight in gradual steps and pourability remained very poor and the gum even appeared to depress pourability, apparently due to a viscosity increasing activity. This experiment was repeated using precrushed ice, but the same results were obtained.

EXAMPLE 58

A water-ice mixture was prepared in the mixer and 2% sorbitol was added producing a slush with very poor pourability. 0.05% of the high viscosity CMC gum was added and pourability became fair. Addition of 0.05% more gum produced very good pourability.

EXAMPLE 59

Example 58 was repeated, substituting dextrose for the sorbitol and the same results were obtained after each addition of the gum as described in Example 58. In both Examples 58 and 59, some frozen product was observed on the inside wall of the Stiffler mixer hopper above the product level but such freezing causes no real problem.

EXAMPLE 60

This example reports an experimental procedure which we carried out for the purpose of producing a complete slush beverage composition. It was desired to keep the solids level low in the formulated product which was to be a dietetic beverage. Initially 1.8% by weight sorbitol was added to a water-ice mixture in the mixer. The mixer was permitted to cycle normally overnight and there was no freezing of the composition; however, the slush had very poor pourability. 0.058 weight percent of sweetener (cyclamate) was added and the pourability did not change noticeably. 0.058% of carboxymethylcellulose was then added and pourability became fair. Citric acid was added as a flavor ingredient in an amount of 0.21 weight percent and some foaming or frothing resulted. Since pourability was still very poor, 0.21 weight percent additional sorbitol was added. The product then had reasonably good pourability but left ice in the bottom of the cup. An additional 0.5% sorbitol was added and the product had excellent pourability.

EXAMPLE 61

The procedure of Example 60 was repeated except that in lieu of 1.8% sorbitol, a mixture of 1.47% sorbitol and 0.33% propylene glycol was used. The results were the same except that after addition of the gum, the pourability was good and after the first supplemental addition, i.e., the 0.21 weight percent, or sorbitol, the pourability became excellent.

EXAMPLE 62

A dextrose-based lemon-flavored slush beverage was prepared by first adding 1.75 weight percent dextrose to the water-ice mixture in the mixer. The following additions were then made to produce a product having excellent pourability:
 0.058% saccharin-cyclamate sweetener (1:10 by weight saccharin:cyclamate)
 0.058% gum
 0.21% citric acid
 0.01% lemon flavor
 0.003% sodium benzoate and
 0.70% additional dextrose

EXAMPLE 63

The procedure of Example 62 was repeated except that in lieu of the initial 1.75% dextrose there was used a mixture of 1.46% dextrose and 0.292% propylene glycol. In this example, as well as in Example 62, slight improvement in pourability was noticed after addition of the gum, but a product having excellent pourability was not obtained until the supplemental addition of 0.70% dextrose.

EXAMPLE 64

This example is for the purpose of illustrating preparation of a slush without using the Stiffler mixer. Accordingly, an ice and water slush mixture was prepared in a three-gallon pail and 1% sodium chloride was added. The contents of the pail were stirred with a portable mixer and the product had excellent pourability. A similar composition without the salt had poor pourability.

EXAMPLE 65

Examples 50 and 51 were repeated using flake ice instead of crushed ice in the water-ice mixture and similar results were obtained.

The ratio of water:ice can be varied according to the desired product and the ingredients added. For example, a milkshake drink preparation often will use a mixture of one gallon of water and eight gallons of ice, prepared in the Stiffler mixer (also containing propylene glycol), milkshake flavoring and other desired ingredients to provide an advantageous pourable milkshake-type of product.

As an example of preparation of a dough product, a mixture of 0.5% salt, 0.5% dextrose and 0.4% propylene glycol is added to a 2:1 ice:water mixture. Thereafter, the slush is pumped through a pipe to a screw mixer where it is mixed with other ingredients, including a levening agent such as delta-lactone, to form a dough. The dough is recovered from the mixer as a chilled dough in which the levening agent is maintained inactive. The resulting dough is then stored under refrigeration.

Another example of preparation of a food product using the invention is in the preparation of sausages. Accordingly, beef and pork trimmings are chopped and mixed in a mechanical mixer together with chopped onions and garlic, allspice, mace, pepper, paprika, sage, caraway and other flavor ingredients. Up to about 2% cereal may be added to the chopped meat, if desired. The mixer generates heat by friction. A limited amount, e.g. up to about 5% of the products of Examples 50 and 53 or the product of Example 1 is then added to the mixer to cool the meat and add salt and sugar to the product as seasoning. The sausage mix is then removed from the mixer, stuffed into casings and stored under refrigeration.

The slush product of the present invention can be used for adding ingredients while chilling a food product as has already been described. Additionally, the slush can be used to retard or stop chemical reactions which may be triggered by high temperatures in many chemical processes, while at the same time adding inhibitors, antioxidants, or other compounding ingredients.

Solvents other than propylene glycol and acetone, as described above, are also useful in the present method and compositions. Solvents which have been found to be especially useful in manufacture of low solids slushes are n-amyl alcohol, ethyl alcohol (190 proof), n-butyl alcohol and glycerol.

The ice crystals formed by the supercooling techniques are agglomerates of small ice crystals and are believed to be porous so that the liquid portion of the slush is party occluded or absorbed within the agglomerate. During supercooling the agglomerates grow to only a small size, e.g., about 1/32 to 1/16 and then stop growing as they become nonagglomerating, non-packing and evenly dispensed throughout the liquid under gentle agitation, i.e. they do not float to the top and pack together.

Other ice particles were used in some of the above examples which were non-agglomerated, e.g. the flaked ice.

It will be seen from the foregoing that we have provided a new and useful method of manufacture which is particularly adapted to the food industry and which involves the use of a flowable ice slush. The method can involve, for example, the manufacture of dough containing water and a solid water-soluble ingredient selected from the class consisting of salts, sugars, sorbitol, water-soluble flavoring ingredients and mixtures thereof and a leavening agent while suppressing an exothermic reaction of the leavening agent. This can be done by preparing a first mixture of water and at least a portion of the water-soluble ingredient with the water-soluble ingredient being in an amount sufficient to function as a freeze point depressant in said mixture. The first mixture is then supercooled to a temperature below 32° F. in its freezing point range with agitation until ice crystals grow to a sufficient size to form a flowable slush of distinct ice crystals in an aqueous solution of water-soluble freeze point depressant ingredient. A second mixture is prepared containing the leavening agent and other dough ingredients. The two mixtures are then mixed together to provide a dough product. The flowable slush chills the dough to a temperature sufficiently low to maintain the leavening agent inactive. Preferably, the first mixture contains from about 0.01 to 0.2 weight percent carboxymethylcellulose and from about 0.1 to 5 weight percent propylene glycol sufficient to disperse the ice particles uniformly throughout the solution under gentle agitation.

In one form of the preferred method the first mixture can be prepared as a liquid, pumpable and gravity pourable aqueous slush having no overrun and having an aqueous phase containing from about 25 to about 75 percent by volume of individual non-packing ice particles having a size in the range of 1/32 to 1/16 inch and having uniform solid ice composition or construction throughout. The individual ice particles are nonagglomerated and, with respect to each other, are nonagglomerating and are uniformly dispersed throughout the aqueous phase under gentle agitation at any temperature between the freezing point of the aqueous phase and the melting point of the ice particles at about 32° F. The water phase contains a portion, at least about 0.1 percent by weight, of the water-soluble ingredient. The water-soluble ingredient is in an amount sufficient to function as a freeze point depressant in the mixture and sufficient to retain the ice particles in an unmelted condition within the water phase so that the product can be stored under gentle agitation at a temperature below 32° F. The amount of freeze point depressant also is sufficient to achieve the uniform dispersion of the ice particles in the water phase. A second mixture is prepared containing the remainder of the other ingredients necessary for forming the dough. The flowable slush is mixed with the second mixture to provide a dough product, so that flowable slush chills the dough to a temperature sufficiently low to maintain the leavening agent inactive.

All parts and percentages given herein are by weight unless otherwise indicated.

We claim:

1. A method for making dough containing water and a solid water-soluble ingredient selected from the class consisting of salts, sugars, sorbitol, water-soluble flavoring ingredients and mixtures thereof and a leavening agent while suppressing an exothermic reaction of the leavening agent, which method comprises preparing a first mixture of water and at least a portion of said water-soluble ingredient with said water-soluble ingredient being in an amount sufficient to function as a freeze point depressant in said mixture, supercooling said first mixture to a temperature below 32° F. in its freezing point range with agitation until ice crystals grow to a sufficient size to form a flowable slush of distinct ice crystals in an aqueous solution of the water-soluble freeze point depressant ingredient, preparing a second mixture containing the leavening agent and other dough ingredients and mixing the flowable slush with the second mixture to provide a dough product, whereby said flowable slush chills the dough to a temperature sufficiently low to maintain the leavening agent inactive.

2. The method of claim 1 wherein said first mixture contains from about 0.01 to 0.2 weight percent carboxymethlylcellulose and from about 0.1 to 5 weight percent propylene glycol sufficient to disperse the ice particles uniformly throughout the solution under gentle agitation.

3. A method for making dough containing water and a solid water-soluble ingredient selected from the class consisting of salts, sugars, sorbitol, water soluble flavoring ingredients and mixtures thereof and a leavening agent while suppressing an exothermic reaction of the leavening agent, which method comprises preparing as a first mixture a liquid, pumpable and gravity pourable aqueous slush having no overrun and consisting essentially of an aqueous phase containing from about 25 to about 75 percent by volume of individual ice particles having a size in the range of 1/32 to 1/16 inch and having uniform solid ice composition or construction throughout, said individual ice particles individually being nonagglomerated and with respect to each other being nonagglomerating and uniformly dispersed throughout the aqueous phase under gentle agitation at any temperature between the freezing point of the aqueous phase and the melting point of the of the ice particles at about 32° F., said aqueous phase containing a portion, at least about 0.1 percent by weight, of the water-soluble ingredient with said water-soluble ingredient being in an amount sufficient to function as a freeze point depressant in said mixture and sufficient to retain the ice particles in an unmelted condition within the water phase so that the product can be stored under gentle agitation at a temperature below 32° F., the amount of freeze point depressant also being sufficient to achieve the uniform dispersion of the ice particles in the water phase, preparing a second mixture containing a leavening agent and the remainder of the other ingredients necessary for forming the dough and mixing the flowable slush with the second mixture to provide a dough product, whereby said flowable slush chills the dough to a temperature sufficiently low to maintain the leavening agent inactive.

4. A method for making dough containing water and a water-soluble ingredient selected from the class consisting of salts, sugars, sorbitol, water-soluble flavoring ingredients and mixtures thereof and a leavening agent while suppressing an exothermic reaction of the leavening agent, which method comprises preparing a first mixture of (1) water, (2) at least a portion of said water-soluble ingredient to form a solution of the water-soluble ingredient in the water with said water-soluble ingredient being in an amount sufficient to function as a freeze point depressant in said mixture, and (3) particles of ice of sufficient size to form a flowable slush of distinct ice particles in the solution, maintaining the solution at a temperature below 32° F. to prevent melting of the ice particles, preparing a second mixture containing the leavening agent and other dough ingredients and mixing the flowable slush with the second mixture to provide a dough product, whereby said flowable slush chills the dough to a temperature sufficiently low to maintain the leavening agent inactive.

* * * * *